United States Patent [19]
Mazurek et al.

[11] Patent Number: 5,798,881
[45] Date of Patent: Aug. 25, 1998

[54] DUAL STATE MIRROR ASSEMBLY

[76] Inventors: Niel Mazurek, 973 Thrush La., Huntingdon Valley, Pa. 19006; Theodore J. Zammit, 1301 Seneca Run, Ambler, Pa. 19002

[21] Appl. No.: 557,456

[22] Filed: Nov. 14, 1995

[51] Int. Cl.⁶ .......................... G02B 7/182; G02B 5/08; G02B 27/00
[52] U.S. Cl. .......................... 359/872; 359/873; 359/875; 359/877; 359/603; 359/604; 359/605; 359/608; 359/609; 248/474; 248/475.1; 248/476
[58] Field of Search .......................... 359/872, 873, 359/875, 877, 603, 604, 605, 608, 583, 581, 584, 585, 609, 589, 614; 248/474, 475.1, 476, 478, 479, 480, 489, 495

[56] References Cited

U.S. PATENT DOCUMENTS

| | | | |
|---|---|---|---|
| 2,806,408 | 9/1957 | Moeller | 359/604 |
| 3,574,446 | 4/1971 | Moore | 359/608 |
| 3,722,984 | 3/1973 | Brean | 359/605 |
| 3,748,025 | 7/1973 | Van Putten, Jr. | 359/605 |
| 3,836,235 | 9/1974 | Russell | 359/604 |
| 3,924,938 | 12/1975 | Carson | 359/605 |
| 3,985,425 | 10/1976 | Clapp | 359/583 |
| 4,337,990 | 7/1982 | Fan et al. | 359/360 |
| 4,371,235 | 2/1983 | Locke, Sr. | 359/605 |
| 4,415,233 | 11/1983 | Itoh et al. | 359/583 |
| 4,560,250 | 12/1985 | Russell | 359/604 |
| 4,773,717 | 9/1988 | Pai et al. | 359/614 |
| 5,179,471 | 1/1993 | Caskey et al. | 359/603 |
| 5,535,056 | 7/1996 | Caskey et al. | 359/603 |

*Primary Examiner*—Paul M. Dzierzynski
*Assistant Examiner*—Mohammad Y. Sikder
*Attorney, Agent, or Firm*—Weiser & Associates, P.C.

[57] ABSTRACT

A dual state mirror assembly for use with motor vehicles includes a housing having an open front for receiving an outer substrate to form an enclosure. The outer substrate has a surface coated with a thin metal film to act as a beam splitter. An inner substrate having a reflective front surface is mounted within the enclosure so that in a first position, the inner substrate is in direct contact with the outer substrate, to produce a single bright reflected image, and so that in a second position, the inner substrate is placed at an angle with respect to the outer substrate, to provide a dimmed image and to minimize glare.

57 Claims, 14 Drawing Sheets

PARTIALLY ROTATED POSITION

CLOSED AND LOCKED POSITION

FULLY ROTATED POSITION

PARTIALLY ROTATED POSITION

CLOSED AND UNLOCKED POSITION

SOLENOID FORCE CURVES

DUAL STATE MIRROR ASSEMBLY

BACKGROUND OF THE INVENTION

The present invention generally relates to a dual state mirror assembly for use with automobiles, trucks, buses and other types of vehicles, primarily as a rearview mirror. The dual state mirror of the present invention is particularly useful as an exterior mirror for larger trucks, including those in classes 6, 7 and 8, as well as buses, and will be described in this general context for convenience of illustration. However, the general principles described will also be useful in conjunction with other types of mirrors, for various types of vehicles, and for other applications such as laser technology.

Early attempts to reduce the glare associated with rearview mirrors for vehicles included the use of prismatic features, and electronic features, including electrochromic and dichroic liquid crystal display technologies.

In the case of prismatic technology, the rearview mirror is provided with two independent states of reflectance using a prismatic element including a high reflectance surface for daytime use, and a low reflectance surface for nighttime use. To operate such a mirror, the driver manually adjusts the position of the prismatic element, depending upon the time of In both positions the driver actually views both prism surfaces, with different images. In the daytime position, the high reflectance surface yields sufficient light to make the dimmer image on the low reflectance surface unnoticeable. In the nighttime position, the high reflectance surface is pointed to a dark region in the vehicle (typically the roof) so as not to interfere with the dimmer image on the low reflectance surface.

In the case of electrochromic and dichroic liquid crystal display technologies, the dimming function is achieved electronically, and is therefore automated.

All of these methods, however, have some key drawbacks. Mirrors that incorporate prismatic surfaces suffer from unpredictable optical quality. If the lighting conditions inside the vehicle become less than optimum (i.e., vehicles travelling closely behind and illuminating the interior), the rearview mirror can produce multiple images. More importantly, prismatic mirrors can not be used for exterior applications since there is no satisfactory dark region to which the high reflectance surface can be directed.

Electrochromic mirrors also tend to produce multiple images. In addition, such mirrors have slow response times and tend to alter the color of the reflected images. Although electrochromic mirrors can be used as exterior mirrors, they are very costly for the relatively large areas associated with exterior mirror applications (particularly for larger vehicles such as trucks and buses).

The use of dichroic mirrors is essentially precluded by regulation. In 1992, the U.S. National Highway Traffic Safety Administration (NHTSA) issued a regulation that all multiple reflectance mirrors revert to a high reflectance state in the event of electrical failure. This condition could not be effectively met with dichroic mirrors.

Earlier efforts to develop a useful dual state rearview mirror, prior to electrochromic and dichroic LCD technologies, employed paired, plate glass elements to achieve the desired result. Examples of these devices may be found with reference to U.S. Pat. Nos. 3,574,446 (Moore); 3,836,235 (Russell); 4,371,235 (Locke, Sr.); and 4,560,259 (Russell). Each of these mirror systems includes an enclosure with a plate glass face, and a mirrored element positioned within the enclosure and spaced from the plate glass face. The mirrored element is capable of movement (i.e., rotation) between daytime and nighttime positions which are primarily determined by the position of the mirrored element relative to the plate glass face of the enclosure.

However, in each case, the disclosed devices are provided with substrate surfaces (plate glass and mirror) which are spaced apart. In addition, the disclosed devices are provided with plate glass and mirrored elements that do not allow for adjustment of the reflective and transmissive properties of the overall system. As a consequence, none of these devices are particularly satisfactory in actual operation. Double images are not uncommon, and the difference between the reflected images the different mirror surfaces (i.e., elements in parallel, in a daytime mode position) is so great that nighttime use (while in a high reflectance, daytime configuration) is seriously compromised.

SUMMARY OF THE INVENTION

It is therefore the primary object of the present invention to remedy the disadvantages of prior dual state mirrors.

It is also an object of the present invention to provide a dual state mirror which exhibits proper reflectance characteristics for promoting both daytime and nighttime use.

It is also an object of the present invention to provide a dual state mirror which provides satisfactory daytime and nighttime modes of operation without being subject to double images.

It is also an object of the present invention to provide a dual state mirror having the foregoing improvements, yet which is simple and inexpensive in construction, as well as reliable and easy to use.

In accordance with the present invention, these and other objects which will be apparent are achieved with a tandem mirror assembly having outer and inner substrates mounted in a specified configuration. In a preferred embodiment, the outer substrate is semi-transparent, and may be configured as a beam-splitter. As an example, the outer substrate may be implemented as a glass substrate having a thin film coating that produces a low reflectance, semi-transparent (mirrored) surface. The inner substrate is reflective, and may be implemented as a thin film coating that produces a high reflectance (mirrored) surface. The inner substrate is movable relative to the outer substrate (which is preferably static) to develop two independently selectable states of reflectance. In one state, the substrates are in direct contact with each other, for daytime use. In the other state, the substrates are angled relative to each other, for nighttime use. When the substrates are in direct contact (i.e., the first, daytime state), the mirror assembly combines to produce a high reflectance image which is void of multiple images. When the substrates are angled with respect to one another (i.e., the second, nighttime state), the mirror assembly combines to produce an enhanced, partially reflective image which is virtually free of glare.

Preferably, the outer substrate is formed of a conventional, transparent material coated with a thin metal film or multiple thin metal films to develop a partial reflectance. Coating materials including indium tin oxide, aluminum and chrome, or a similar material capable of producing a nominal specular reflectance of 15% for incident light in the visible spectrum, and nominal transmissive values on the order of 75% for incident light in the visible spectrum, may be used for such purposes. The inner substrate is preferably formed of a conventional glass, metal or plastic substrate, or a similar, mechanically rigid material that can be mirrored, provided with a thin film coating (on its front surface) capable of producing a nominal reflectance of 90% for visible wavelengths of light. Optionally, the inner substrate may be developed such that the reflectance lies in a range between 60% and 95%. In this way, as distinguished from solid state mirrors which have a limited reflectance range, the mirror assembly of the present invention can simultaneously develop both maximum (>80%) and minimum (<15%) reflectance values, as desired.

Such a device is ideally suited as an externally mounted, rearview mirror for large trucks categorized by classes 6, 7 and 8, as well as buses, where the characteristics of the substrates and their relationship to each other (and relative to the driver) are particularly important. This is because unlike previous mirror assemblies, the mirror assembly of the present invention includes an outer substrate in which the reflectance and the transmissivity values can be adjusted, promoting nighttime use, and is implemented as a dual substrate assembly in which the outer substrate and the inner substrate are placed in direct contact with each other, promoting daytime use.

The foregoing mirror assembly is preferably implemented within a casing for receiving the outer and inner substrates. It is an important feature of the present invention that the substrates are contained within the casing and in contact with each other, and that the means which are provided to move (rotate) the inner substrate operate to angle the inner substrate away from the outer substrate, to develop the low reflectance state. In this angled position, only the image of the outer (low reflectance) substrate is observed by the driver, so that no reflected light from the inner substrate is observed. The driver, therefore, sees a dimmed (anti-glare) version of the original image (i.e., a vehicle's headlights).

Such movement can be controlled mechanically, by a simple lever, or electrically, by a solenoid (or solenoids) housed within the casing which receives the mirror assembly. In a preferred embodiment, the solenoid, when energized, extends a plunger that applies a force to the inner substrate relative to its axis of rotation (using, for example, a tubular push-type solenoid). A spring is used to provide forces for returning the inner substrate to its initial position, in contact with the outer substrate. The solenoid preferably operates in conjunction with a locking mechanism for maintaining the inner substrate in its closed position, in direct contact with the outer substrate. Such an assembly operates to place the mirror assembly of the present invention (whether mechanically or electrically implemented) in compliance with the above-mentioned safety standards established by the U.S. National Highway Traffic Safety Administration.

Optionally, a miniature DC motor could be used as an actuator for moving the inner substrate to the low reflectance state. A cooperating return spring mechanism would again be required to ensure that the mirror assembly reverts to a high reflectance state in the event of a power interruption. Miniature air-operated or hydraulically-operated pistons could similarly be used to move the inner substrate relative to the outer substrate, as well as other types of solenoids, including pull-type solenoids, as well as box-type and U-type solenoids.

Irrespective of its manner of implementation, the mirror assembly of the present invention may additionally be provided with a conventional mirror heating device, for de-icing purposes.

For further discussion of the dual state mirror assembly of the present invention, reference is made to the detailed description which is provided below, taken in conjunction with the following illustrations.

DETAILED DESCRIPTION OF THE INVENTION

Figure 1:
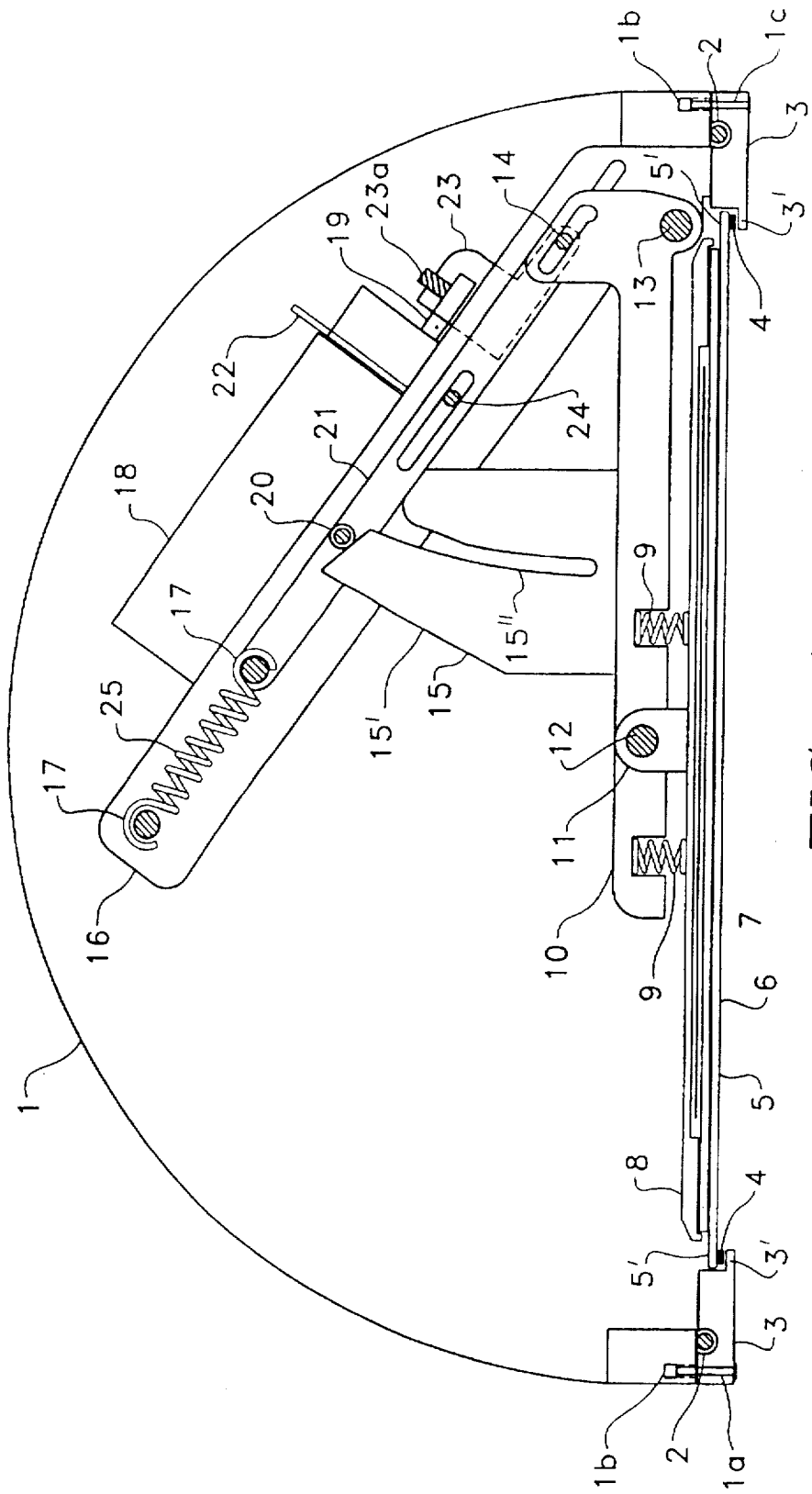
FIG. 1 is a cross-sectional view of a casing for housing the mirror assembly of the present invention, showing the mirror assembly in a position suitable for daytime use.

The improvements of the mirror assembly of the present invention are generally achieved using two mirrored substrates mounted within a case (i.e., a housing). The drawings submitted herewith illustrate a case suitable for use as an outside rearview mirror for a truck or bus, and further discussion will proceed based upon this illustrated embodiment. However, it should be understood that this represents only one of a variety of applications for the mirror assembly of the present invention, other housings, and other implementations of the mirror assembly may be developed for similar applications (i.e., trucks and buses), including both left-side and right-side rearview mirrors, as well as for other types of vehicles (e.g., small trucks and automobiles), or for other applications (e.g., laser technologies). Such housings and mirror assemblies may be configured to suit the environment in which they will be used. Consequently, the following discussion should not be taken as a limitation to the potential applications for the improvements of the present invention.

Referring now to FIGS. 1 through 6, the case 1 is implemented as a left-side, rearview truck mirror. The case 1 is semi-cylindrical in shape and may be formed of any material suitable for exposure to the elements. Suitable end caps (not shown) can be provided to finish the ends of the housing, or shaped, integral ends may be used to finish the housing, as desired. The size of the housing will vary with the size of the mirror which is preferred for a particular application, or a particular make and model vehicle.

An outer (low-reflectance) substrate 5 is mounted in fixed position to the case 1, completing an enclosure which is preferably sealed to the elements. To this end, edge portions 5' of the outer substrate 5 are held against the flanges 3' of a frame 3 (i.e., a face plate). Gaskets 4 are provided to seal the outer substrate 5 to the frame 3. The frame 3 is in turn attached to the case 1 (e.g., by rivets 1a or other suitable fasteners for engaging blind holes 1b provided in the case 1). Additional gaskets 2 are preferably situated between the frame 3 and the case 1 to complete a seal which is suitable for preventing rain, dust, salt or other contaminants from entering the housing and reaching the structural elements of the mirror assembly.

In its preferred embodiment, the outer substrate 5 is configured as a beam-splitter (i.e., having partially transmissive and partially reflective characteristics), and is implemented as a transparent or translucent plate provided with suitable front and back coatings. For example, referring to FIG. 2, the rear surface of a glass plate can be coated with a thin metal film (shown at 27) or multiple films (including indium, tin, aluminum, chrome and nickel, as well as combinations of these materials and their oxides) capable of producing a nominal specular reflectance of 15% for incident light in the visible spectrum and a nominal transmissivity of 75% for incident light in the visible spectrum. The thin metal film 27 may further be provided with a protective, transparent over-coating to protect against mechanical abrasion and/or degradation of the thin metal film 27 due to the environment. One such material for implementing this protective over-coating is silicon oxide (SiO).

The rear surface of the glass plate is optionally coated to produce varied reflectance values of between 10% and 30%, and to develop corresponding transmissivity values of between 80% and 60%, respectively. Such coatings can be uniformly applied to the glass plate, or selectively applied to the glass plate to form a segmented substrate, if desired. The combination of reflective and transmissive values can be varied, as needed, depending upon the intended application for the mirror assembly. In such case, the characteristics of the thin metal film 27 can be varied, or multiple films can be used, to achieve a range of useful reflective and transmissive values.

The thickness of the outer substrate 5 may vary, but is preferably between 0.062 and 0.125 inches. The front surface of the outer substrate 5 can additionally be provided with an anti-reflective coating 28, to minimize front surface reflections. Such coatings will typically develop a reflectance on the order of less than 4%.

Positioned directly behind the outer substrate 5, and housed within the case 1, is an inner (reflective) substrate 6. The inner substrate 6 is preferably implemented as a front surface, reflecting mirror. For example, and referring again to FIG. 2, the front surface of a glass plate can be coated with a thin film (shown at 26) capable of producing a nominal reflectance of 90% for visible wavelengths of light. Again, such coatings can be uniformly applied to the glass plate, or selectively applied to the glass plate to form a segmented substrate, if desired. The values for this reflectance may vary between 60% and 95%, as desired. The thickness of the inner substrate 6 may also vary, but is preferably between 0.062 and 0.125 inches.

The inner substrate 6 is attached to a mechanism for moving (i.e., rotating) the inner substrate 6 relative to the outer substrate 5, between a daytime position (shown in FIG. 1) in which the inner substrate 6 is in direct contact with the outer substrate 5 and a nighttime position (FIG. 3) in which the inner substrate 6 is placed at an angle relative to the outer substrate 5. In accordance with the present invention, and as will be discussed more fully below, the inner substrate 6 is preferably moved relative to the outer substrate 5 along contiguous, lateral edges of the substrates 5, 6 to facilitate direct contact between the substrates 5, 6 when placed in the daytime operating position.

The substrates 5, 6 of the present invention will typically be flat, but can also be made convex in shape to create a convex dual state mirror. In such case, the rear surface of the outer substrate and the front surface of the inner substrate would be provided with matching radii to ensure proper surface contact between the two substrates when in the closed position (to develop the high reflectance state). This can be accomplished by "sagging" glass onto matching tools, using techniques which are themselves known (e.g., a glass plate is placed on a shaping tool and heated until it sags onto the tool, taking the shape of the tool).

The case 1 can be fabricated in any of a variety of ways, but is preferably formed as a single piece, either from a molded plastic or from sheet metal. As previously indicated, the case 1 can also be fabricated from multiple pieces which are suitably assembled, if desired. Regardless of its manner of fabrication, the case 1 must be configured to allow sufficient space for the inner substrate 6 to rotate away from the outer substrate 5, to an appropriate angle, and for the mechanism which is used for such purposes. The case 1 is further preferably configured to assume an aerodynamic shape, to reduce wind resistance resulting from placement of the rearview mirror on the vehicle. The inner surface of the casing, which can be exposed reflected light as the inner substrate 6 is rotated away from the outer substrate 5, is preferably formed as a non-reflecting, light absorbing surface, and is therefore typically provided with a flat black finish (or equivalent). This assists in preventing the glare of reflected light, and in eliminating extraneous light or images observed by the driver, as will be discussed more fully below.

If desired, the frame 3 of the case 1 can be provided with a sub-frame, to allow for the convenient cleaning of any contaminants that may come to accumulate and become visible on the substrates 5, 6 over time. Such a sub-frame could easily be removed (using, e.g., a set of quick disconnect fasteners) to expose the rear surface of the outer substrate 5 and the front surface of the inner substrate 6, to allow for their cleaning.

In its preferred embodiment, the rotation mechanism includes a support assembly comprised of a mounting plate 8, a mounting arm 10 and a locking bracket 15 which cooperate to receive the inner substrate 6. These components, in conjunction with a locking mechanism which will be described more fully below, cooperate to move the inner substrate 6 relative to the outer substrate 5, between a closed position in which the substrates 5, 6 are in direct contact (daytime mode) and an open position in which the substrates 5, 6 are placed at an angle to each other (nighttime mode).

Figure 2:
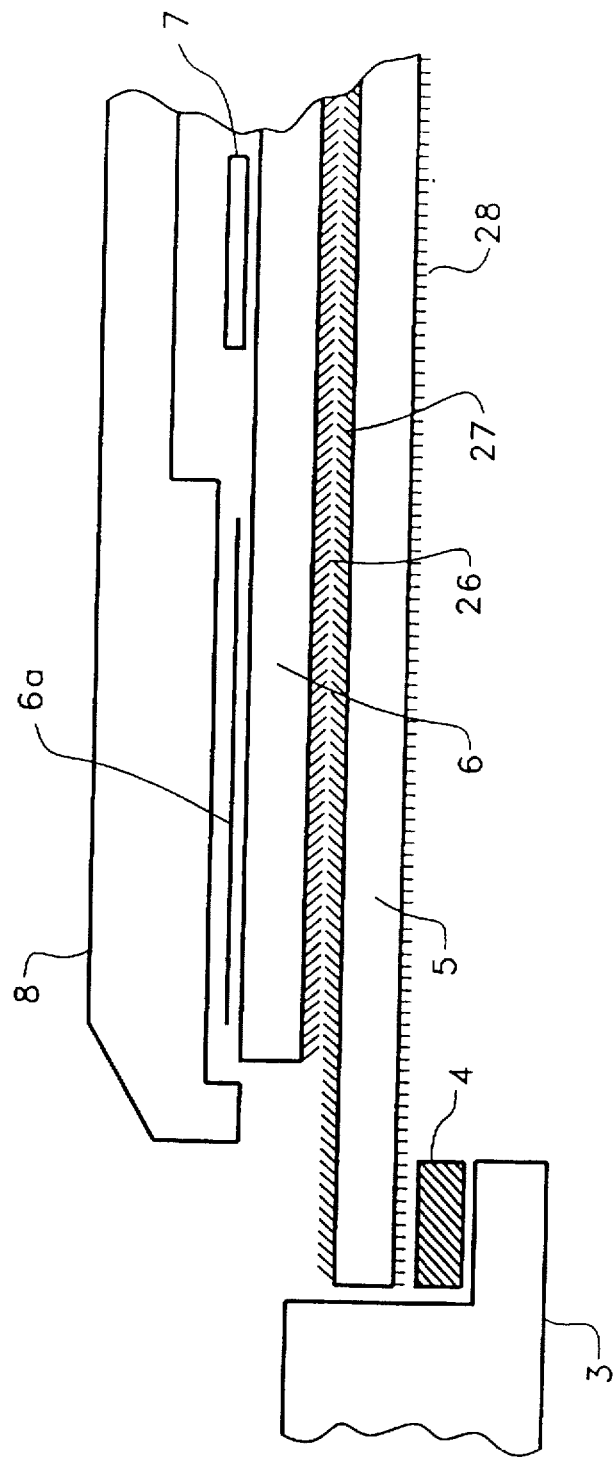
FIG. 2 is a partial sectional view of the two substrates comprising the mirror assembly.

The mounting plate 8 preferably receives the inner substrate 6 in a recessed portion for seating the inner substrate The inner substrate 6 can be attached to the mounting plate 8 by any of a variety of conventional attachment devices including the double-faced foam tape 6a shown in FIG. 2, as well as epoxies, glues or the like, or mechanical fasteners and brackets. The mounting plate 8 further includes a hinge 11 for engaging a pivot 12 associated with the mounting arm 10. Springs 9 are situated on either side of the hinge 11 and pivot 12 so that when the substrates 5, 6 are not in contact, the mounting plate 8 is prevented from rotating freely at the hinge 11, and so that when the substrates 5, 6 are moved into the daytime position, a direct (parallel) contact is established between the substrates 5, 6. One or more mounting arms 10 may be provided for engaging the mounting plate 8, depending upon the length of the substrates 5, 6 and the conditions under which the mirror assembly will be used. The locking bracket 15 may be fixed to any one of the mounting arms 10 which may be provided, or plural locking brackets 15 may be fixed to selected mounting arms 10, as desired.

The mechanism which is provided for moving the inner substrate 6 relative to the outer substrate 5 further includes a locking mechanism which operates to manipulate the foregoing components, between a locked and an unlocked position. As is additionally illustrated in FIG. 4, the locking mechanism generally includes a mounting bracket 16 and an associated slider linkage 21. The slider linkage 21 is preferably formed as a narrow, flat metal band having an extended oval slot 24' for engaging a shoulder screw 24 extending from the mounting bracket 16. The mounting bracket 16 is further rotatably connected to the mounting arm 10 (or arms) at a pivot 13, for engaging an aperture 13' formed in the mounting bracket 16.

A solenoid 18 is fitted to the mounting bracket 16 using, for example, the mounting bracket 22, and operates to rotate the inner substrate 6 about one of its lateral edges (the edge closest to the driver). To this end, the mounting arm 10 (or arms) is rotated relative to the mounting bracket 16, about the pivot 13, responsive to operations of the solenoid 18. As previously indicated, the mounting plate 8 is afforded a limited degree of independent motion (pivoting movement) relative to the mounting arm 10 (or arms). By rotating the inner substrate 6 along a lateral edge contiguous with the corresponding lateral edge of the outer substrate 5, and by allowing the inner substrate 6 to pivot relative to the outer substrate 5, the inner substrate 6 is caused to come into full contact with the outer substrate 5, along its full surface, irrespective of which portions of the substrates first touch during closure. Such rotation preferably occurs in less than one second (to avoid distracting the driver), and is readily accomplished by applying a nominal voltage to the solenoid 18.

The solenoid 18 includes a plunger 19, which is caused to move linearly in the general direction of the pivot 13. The plunger 19 is fitted with a coupling 23, which is attached to the plunger 19 using, for example, set screws or similar attachments. The coupling 23 includes a shoulder screw 14 for simultaneously engaging a slot 14' formed in the mounting bracket 16 and an aperture 14" formed in the slider linkage 21 (see FIG. 4), to complete the mechanical connection between the mounting bracket 16 and the slider linkage 21, and the mounting arm 10 (or arms). The slots 14', 24' and shoulder screws 14, 24 operate to confine the slider linkage 21 to linear movements along the longitudinal axis of the mounting bracket 16.

The slider linkage 21 further includes a roller bearing 20 (attached at a predetermined distance of approximately 3 inches from the pivot 13) for engaging the locking bracket 15 (or brackets) associated with the mounting arm 10 (or arms), and a shoulder screw 17 for receiving a spring 25. The spring 25 is similarly received by the mounting bracket 16 (using a similar shoulder screw 17), and is preferably sized to provide a return force of approximately 2 lbs. The return force of the spring 25 will in turn act on the roller bearing 20, through the slider linkage 21.

In operation, the components of the locking mechanism 16, 21 interact with the support assembly 8, 9, 10 and the locking bracket 15 to appropriately bias the mounting arm 10, and accordingly, the inner substrate 6. Such components are normally biased to urge the inner substrate 6 into contact with the outer substrate 5. To this end, the slider linkage 21 is urged in a direction away from the pivot 13 by the spring 25. The direction of the resulting force is generally along the line of action of the spring 25, in line with the mounting bracket 16 and the slider linkage 21. The top surface 15' of the locking bracket 15 is sloped to allow for smooth interaction with the roller bearing 20 of the slider linkage 21, which slides along the locking bracket 15. When the inner substrate 6 is in contact with the outer substrate 5, the slider linkage 21 is pulled back by the spring 25 and the roller bearing 20 engages the sloped top edge 15' of the locking bracket 15. The return force developed by the spring 25 urges the roller bearing 20 against the sloped top surface 15' of the locking bracket 15, applying a force directly to the locking bracket 15. This force is applied in a direction, and at a distance (e.g., of approximately 3 inches) from the pivot 13 which is appropriate to maintain a positive bias between the mounting bracket 16 and the mounting arm 10 (through the locking bracket 15) which operates to maintain the inner substrate 6 in contact with the outer substrate 5.

Figure 3:
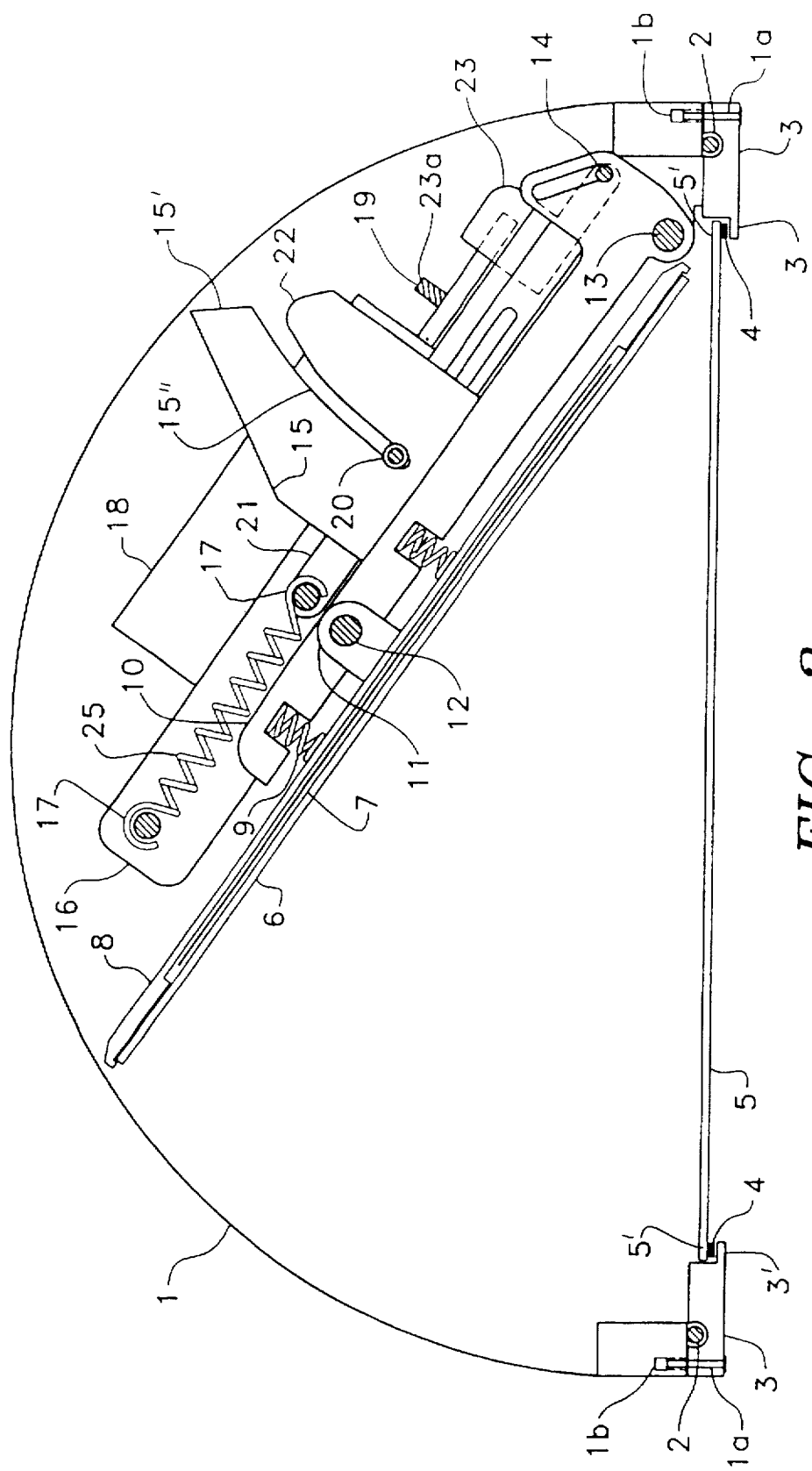
FIG. 3 is a cross-sectional view similar to FIG. 1, showing the mirror assembly in a position suitable for nighttime use.
Figure 4:
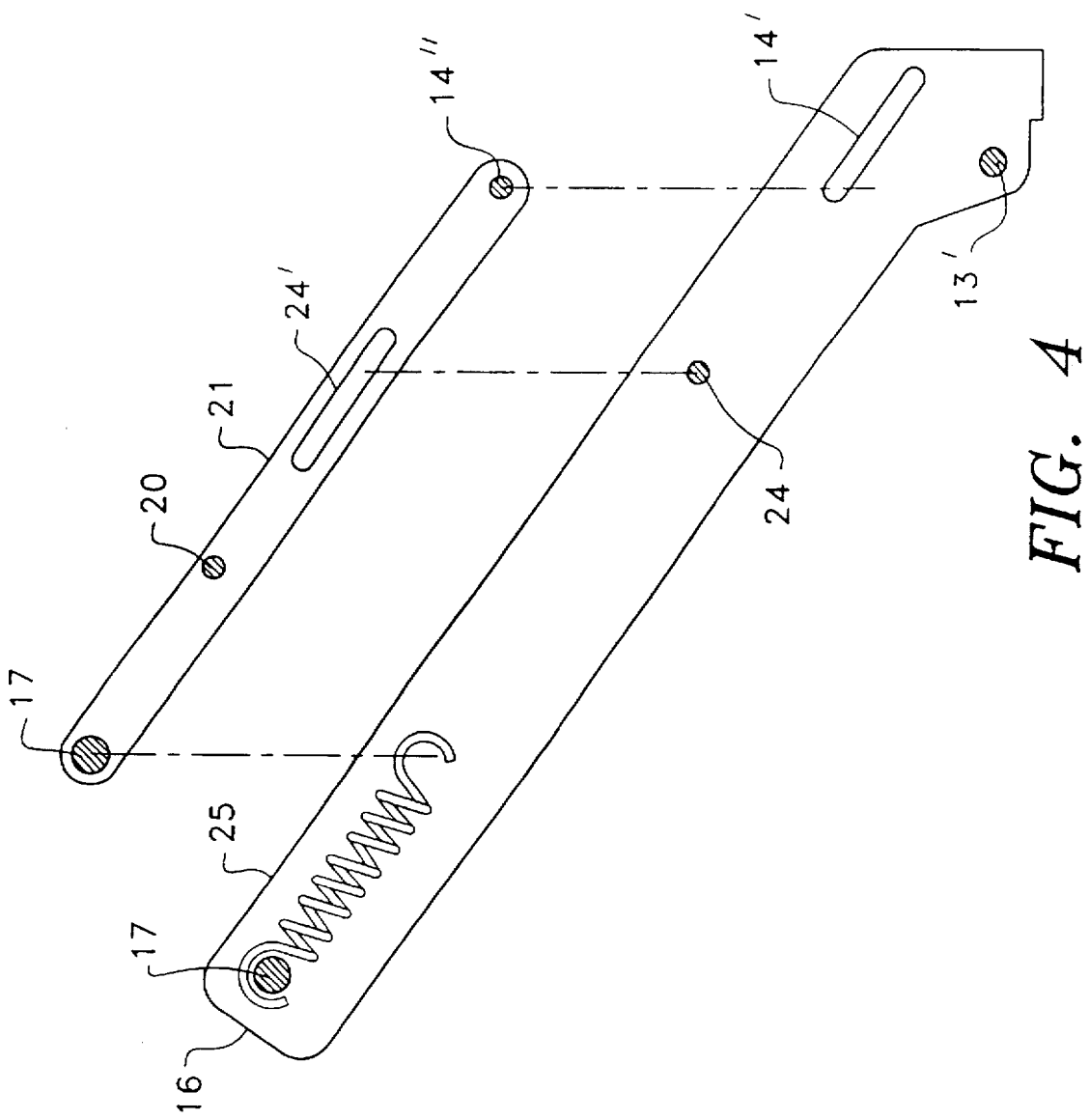
FIG. 4 is an exploded elevational view of components of the rotation mechanism.
Figure 5:
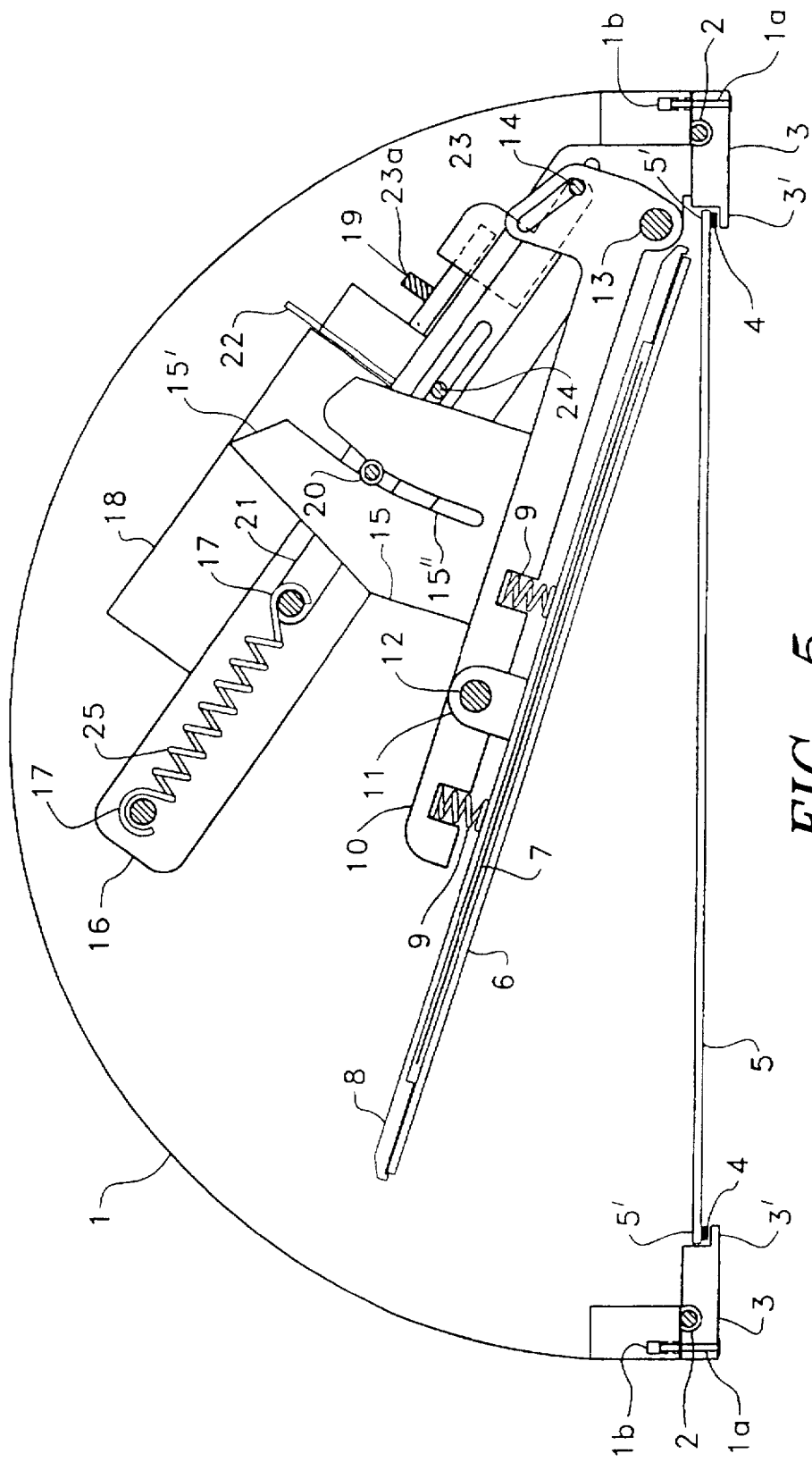
FIGS. 5 and 6 are cross-sectional views similar to FIGS. 1 and 3, showing the mirror assembly in intermediate operating positions.
Figure 6:
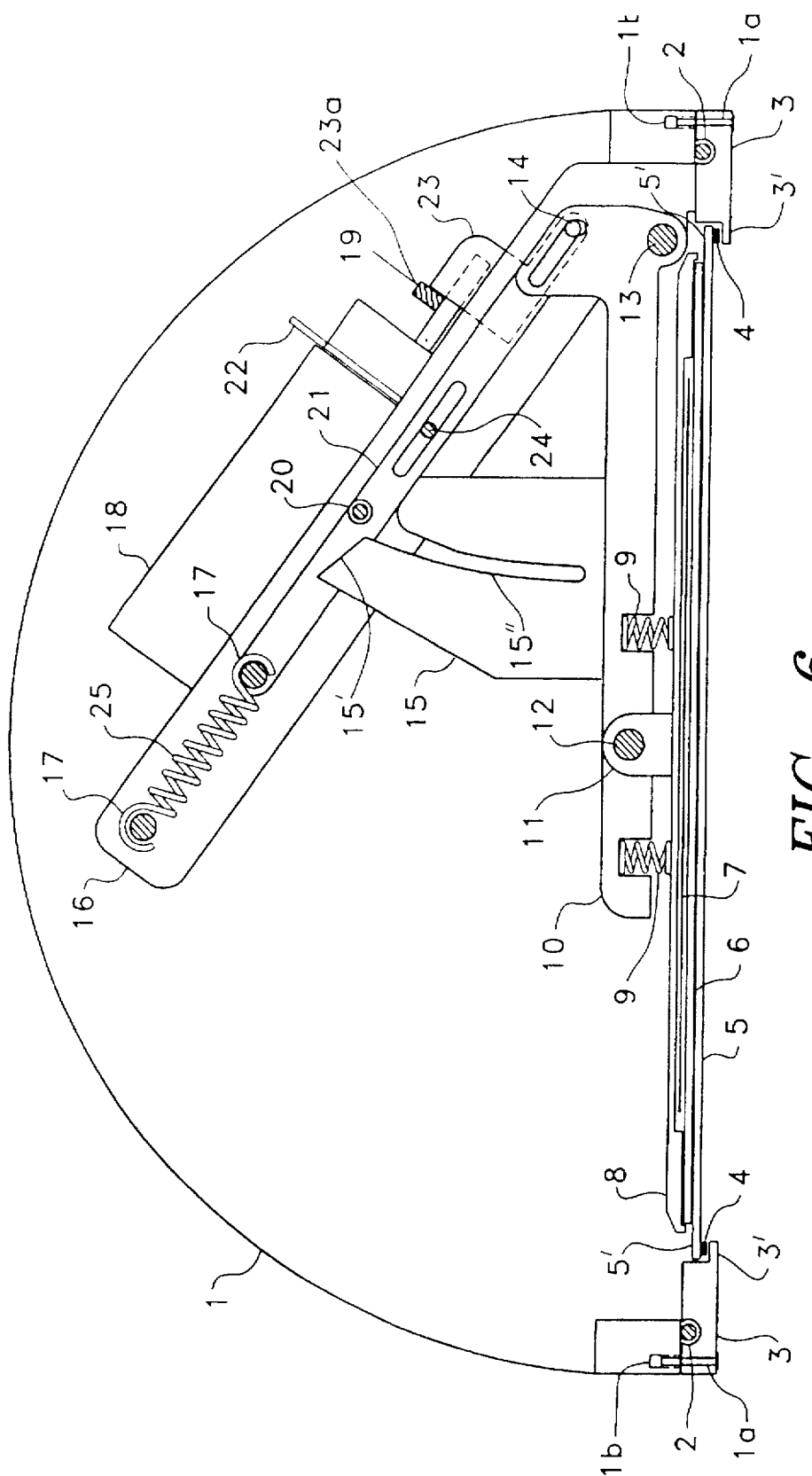

Movement of the above-described components from the closed (daytime) position to the open (nighttime) position will now be described. As previously indicated, to move the mirror assembly from the closed position (FIG. 1) to the open position (FIG. 3), a voltage is applied to the solenoid 18. This, in turn, causes extension of the plunger 19. Initial movement of the plunger 19, and the coupling 23, causes only the slider linkage 21 to move. As the slider linkage 21 moves, the roller bearing 20 attached to the slider linkage 21 is moved away from the top edge 15' of the locking bracket 15, removing the locking forces applied to the support assembly. As the slider linkage 21 continues to move, the shoulder screw 14 is extended to the end of the slot 14' in the mounting arm 10. At this point, the shoulder screw 14 begins to push against the mounting arm 10, causing the mounting arm 10 to rotate about the pivot 13. The inner substrate 6 is in this way caused to rotate away from the outer substrate 5, and the roller bearing 20 is received within a slot 15" formed in the locking bracket 15, passing the intermediate position of FIG. 5. This continues until the mounting plate 8, the mounting arm 10 and the locking bracket 15 reach their fully seated position, as shown in FIG. 3. At this point, the support assembly has been fully rotated to its open position (FIG. 3). Typically, an angle of 35 degrees is formed for the illustrative embodiment shown, although this angle may vary from 20 degrees to 40 degrees for other embodiments, or for other applications.

In implementing the foregoing, the solenoid plunger 19 is preferably allowed to move about 0.2 inches before the shoulder screw 14 is allowed to reach the end of the slot 14' in the mounting arm 10. This is done to ensure that the mounting arm 10 is completely unlocked, allowing the assembly to rotate into its open position as previously described. The solenoid plunger 19 will preferably then continue its travel, for an additional 0.3 inches, until the support assembly is fully seated. The shoulder screw 14, acting within the slot 14' in the mounting arm 10, preferably provides a moment arm of about 0.5 inches relative to the pivot 13. Linear translation of the shoulder screw 14 by approximately 0.3 inches at a moment arm of 0.5 inches has been found to be sufficient to properly rotate the mounting arm 10 through the preferred angle of approximately 35 degrees, although such parameters are capable of change to suit a particular application, if desired.

The return spring 25 preferably has a spring constant of 6 lbs/in. In conjunction with the foregoing operations, the spring 25 is initially stretched to produce a force of 2 lbs (at the locked position of the slider linkage 21), and is then stretched to produce a force of 5 lbs (at the fully extended position of the slider linkage 21). The open position is maintained against the force of the spring 25 by the solenoid 18, so that the support assembly is maintained in its seated position responsive to a continuous voltage applied to the solenoid 18 (in excess of the return force of the spring 25). As an example, the force needed to maintain the mounting assembly in the open position is approximately 3 lbs, acting at a point which lies about 0.5 inches from the axis of rotation. It is important to note that small intermittent movements of the support assembly (while in the open position) due to shock and vibration will not be observable to the driver, and that in the event of an electrical failure, the forces of the return spring 25 will overcome the solenoid 18, returning the support assembly to the closed (daytime) position. Thus, proper operating conditions are met at all times.

Movement of the mounting assembly from the open (nighttime) position to the closed (daytime) position is accomplished by removing the voltage from the solenoid 18. As a result, the return spring 25 (with an initial force of 5 lbs) operates to pull the slider linkage 21 and the shoulder screw 14 back to their initial, locked position, as previously described. The shoulder screw 14 preferably acts against the slot 14' in the mounting arm 10 at a moment arm of about 0.5 inches, to rotate the mounting arm 10 (and the support assembly) toward the closed position. As the support assembly is rotated (to the closed but unlocked position of FIG. 6), the shoulder screw 14 is withdrawn from the slot 15" in the locking bracket 15, and a lateral edge of the inner substrate 6 is brought into contact with the outer substrate 5. The inner substrate 6 will continue to close, and the mounting plate 8 will be allowed to pivot at the hinge 11, until the two substrates 5, 6 are in full contact over their entire width (and length).

Even after the support assembly reaches this closed position, the slider linkage 21 continues to move, causing the roller bearing 20 to become firmly wedged against the sloped, mating surface (the top edge 15') of the locking bracket 15. As a result, the mounting assembly is locked in its closed position (FIG. 1), and the system is placed in equilibrium such that the sum of the forces acting on the roller bearing 20 equals zero.

Figure 7:
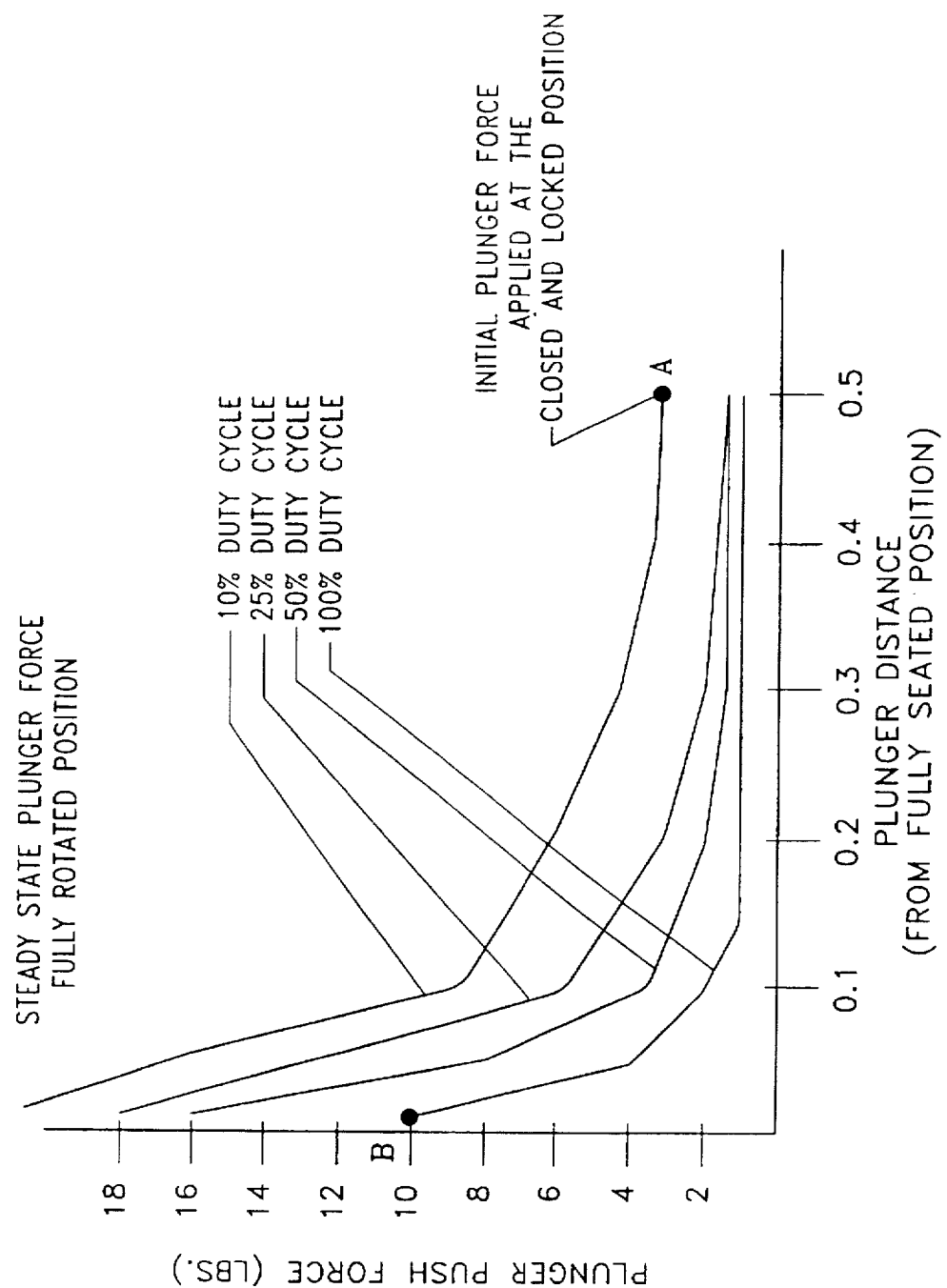
FIG. 7 is a graph showing a series of curves which illustrate solenoid plunger pushing forces as a function of the distance of the plunger from its fully seated position.

An important aspect of the foregoing is the proper operation of, and maintenance of the conditions established for the several components previously described, particularly the solenoid 18. Preferably, the solenoid 18 is a tubular, direct current solenoid, with a plunger 19 configured for push-mode operation. FIG. 7 illustrates the preferred force characteristics for the solenoid 18, and shows that the available plunger force will generally increase as the plunger 19 nears its fully seated position. In addition, the available force will increase as the duty cycle for the solenoid 18 is reduced from 100% (on all the time) to 10% (off 90% of the time). The maximum power at which the solenoid 18 can operate is based on the power utilized over a period of time, whether supplied at continuous (constant) levels or in relatively large, short duration pulses.

However, since the support assembly may be called upon to remain in the open position for significant periods, a 100% duty cycle for the solenoid 18 is required for proper operation to result.

It is further desirable, for both optical and environmental reasons, for the mounting assembly to be closed and locked with the greatest possible force, to keep the substrates 5, 6 in full contact and to minimize the formation of multiple images. In the closed position, the return force of the spring 25 determines the locking force applied to the support assembly.

The spring 25 also establishes the initial force that the solenoid 18 must produce to start the slider linkage 21 in motion (when voltage is applied to the solenoid 18). Consequently, it is desirable to maximize the initial (starting) force produced by the solenoid 18 without increasing the size of the solenoid (i.e., typically a length of 2 inches and a 1 inch diameter), and to maximize the power developed by the solenoid 18 to maintain the support assembly in the open position.

FIG. 7 shows that the maximum available starting forces are produced at a 10% duty cycle for the solenoid, and that solenoid forces are characteristically at a minimum when the solenoid is in its initial position (when operated continuously). For this reason, and to achieve an optimum result, it is preferred that the solenoid 18 initially operate at the high power (watts), low duty cycle (10% duty cycle) mode which is identified at point A of FIG. 7. Once the solenoid 18 reaches its fully seated position, it is preferable to reduce the voltage and to cause the solenoid 18 to assume the continuous operating condition (100% duty cycle) identified at point B of FIG. 7.

Figure 8:
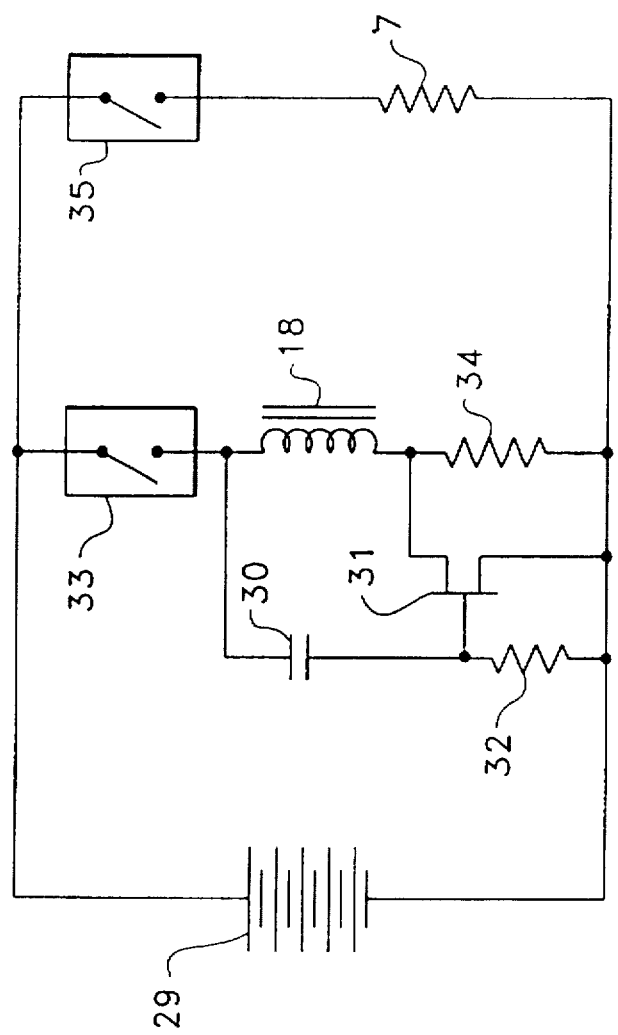
FIG. 8 is a schematic diagram of a preferred electrical circuit for operating the mirror assembly of the present invention.

Solenoids manufactured by "Lucas", "Guardian", "Densitron", and others, are capable of satisfying the foregoing requirements. The selected solenoid is preferably configured to operate at 14.0 VDC at a 10% duty cycle, and at 4.4 VDC at a 100% duty cycle. As a result, the application of a voltage derived from a typical vehicle battery (i.e., a voltage of approximately 13 volts) to the solenoid 18 will produce an initial force in excess of 4 lbs at the plunger 19, for the mechanical configuration previously described. After the mounting assembly has been fully rotated (open), the solenoid voltage is preferably reduced to 4.4 VDC (continuous), producing a holding force in excess of 8 lbs for the mechanical configuration previously FIG. 8 shows a preferred schematic for implementing the above-described electrical functions. In this schematic, the vehicle's conventional battery is shown at 29. A resistor 34 is placed in series with the coil of the solenoid 18 and the battery 29. A field effect transistor 31 is placed in shunt, across the resistor 34, and is biased responsive to a series connected resistor 32 and capacitor 30. The gate of the field effect transistor 31 is in this way biased responsive to a time constant (RC) which represents the amount of time elapsed between the initial application of the voltage to the system (following closure of the switch 33) and the time at which the resistor 34 is to be short circuited. In its preferred embodiment, the circuit (the RC combination) is designed to short circuit the resistor 34 approximately 5 seconds after power is first applied to the solenoid 18.

Figure 9:
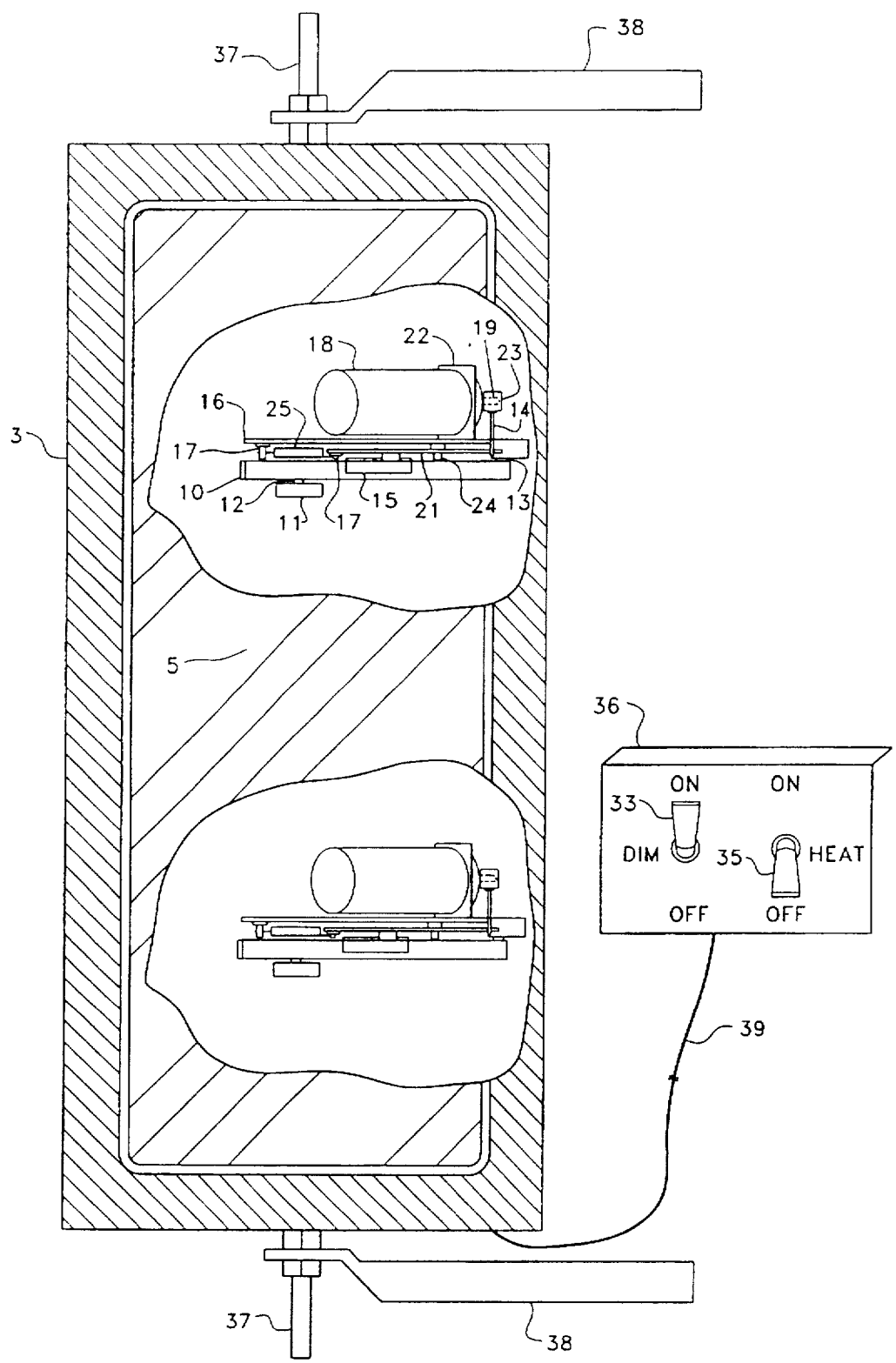
FIG. 9 shows an overall system for implementing the improvements of the present invention.

A complete system for implementing the improvements of the present invention is illustrated in FIG. 9, which depicts a left-side rearview mirror. The rearview mirror which is shown incorporates the improvements previously described, and is mounted to a vehicle (not shown) by suitable mounting brackets 38. The mounting brackets 38 engage pivots 37 associated with the case 1 of the rearview mirror, to permit adjustment of the rearview mirror to suit the driver. The structure of the rearview mirror substantially corresponds to the structure previously described, and employs two mounting arms 10 for supporting the inner substrate 6. Each of the mounting arms 10 is associated with a separate solenoid 18, which is preferred to ensure proper operation of the assembly while minimizing the size of the solenoids. A similar result could be achieved with additional solenoids, or even a single solenoid, suitably adjusted in terms of their characteristics to provide the forces needed to operate the inner substrate 6 as previously described.

A cable 39 connects the rearview mirror with a control panel 36. The cable 39 includes the electrical connection extending between the solenoids 18 and the switch 33 which operates them. The "OFF" position represents an open switch 33, establishing the daytime mode of operation previously described. The "ON" position represents a closed switch 33, establishing the nighttime (dimmed) mode of operation previously described. Operation of the system is in this way made simple, avoiding the need for the driver to divert attention from the road. All other operations are performed automatically, responsive to operation of the electrical circuit of FIG. 8.

As an additional, and optional feature, the system of FIG. 9 further includes a heater for defrosting the surface of the substrate 5. Referring to FIG. 2, such a heater is implemented with a heating element 7 which is preferably formed as a capton film containing resistive elements laminated to the rear of the inner substrate 6 (and received within a recess formed in the mounting plate 8). The cable 39 (FIG. 9) additionally includes an electrical connection for communicating with the switch 35 provided on the control panel 36. As shown in FIG. 8, the switch 35 and the heating element 7 with which it communicates, are placed in series with the vehicle's battery 29. When a voltage from the battery 29 is applied to the heating element 7, the temperature of the inner substrate 6 will rise rapidly. Contact between the substrates 5, 6 will cause heat to be transferred from the inner substrate 6 to the outer substrate 5. In this way, the temperature of the outer substrate 5 can be caused to rise to approximately 50° C., in about 1 minute, which is sufficient to melt ice forming on the outer substrate 5.

Figure 10A:
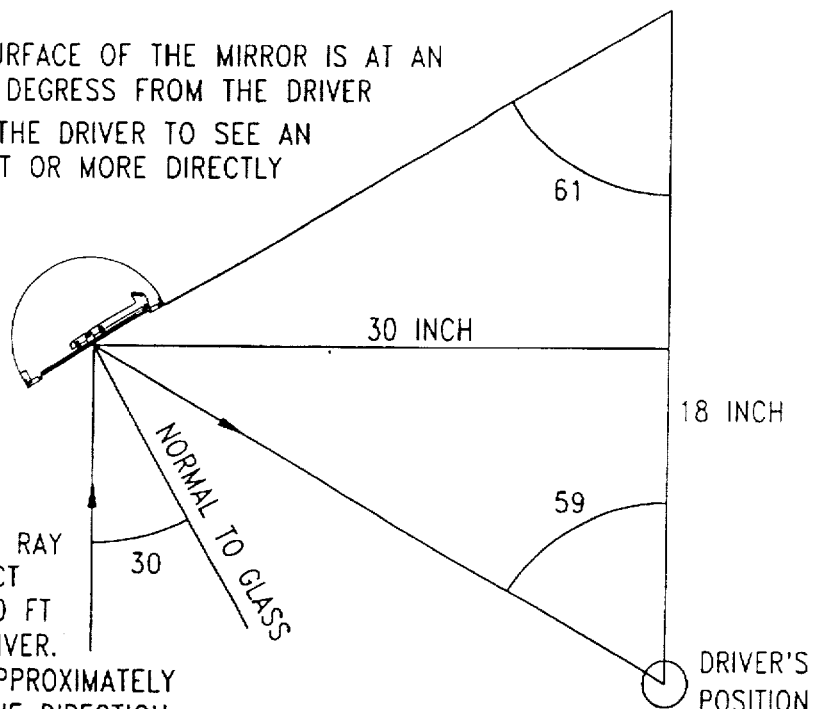
FIG. 10A is a schematic illustration of the optics of the mirror assembly of the present invention in a daytime mode of operation.

FIG. 10A schematically (optically) illustrates the mirror assembly of the present invention in a typical (mounted) configuration as a rearview mirror in a daytime mode of operation. As a result, the inner substrate 6 is in contact with the outer substrate 5. The mirror assembly is adjusted to the comfort of the driver, in usual fashion. In this configuration, light is reflected (by the inner substrate 6 and by the front and rear surfaces of the outer substrate 5) to the driver, providing a clear view of images to the rear. Because the two substrates 5, 6 (i.e., the mirrored surfaces) are in contact, the resulting images formed are overlapping such that double images are not perceived by the driver. The brightness or total reflectance of the resulting image will be the sum of the reflectance from each surface. Because the front surface of the outer substrate 5 is not mirrored, the image produced has significantly less brightness than the image produced by the mirrored surface. As such, the image of reduced brightness is not perceived by the driver. This substantially corresponds to the images which would be developed with prior mirror assemblies, such as the mirror assembly shown in FIG. 10B (the assembly of U.S. Pat. No. 4,371,235 has been selected for purposes of illustration). The space between the substrates of the mirror assembly of FIG. 10B (which is provided to permit rotation of the inner substrate) has little effect on the clarity of a reflected, daytime image. However, as will be discussed more fully below, the image produced with the mirror assembly of FIG. 10B will be seriously compromised by this spacing in other ways.

Figure 11A:
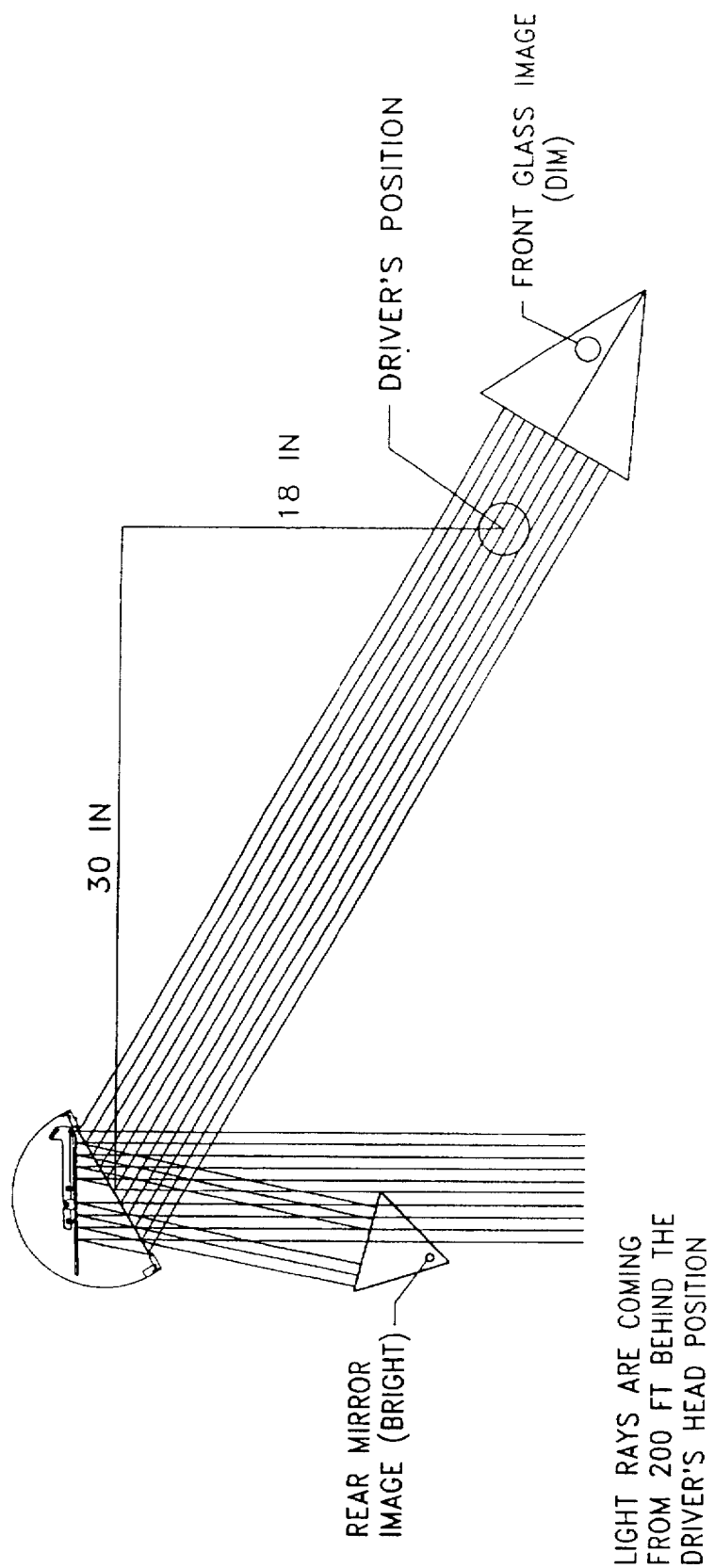
FIG. 11A is a schematic illustration of the optics of the mirror assembly of the present invention in a nighttime mode of operation.

FIG. 11A schematically (optically) illustrates the mirror assembly of the present invention in a typical (mounted) configuration as a rearview mirror in a nighttime mode of operation. In this illustration, the inner substrate 6 is rotated 35 degrees from the outer substrate 5. As a result of this, a major portion of the light passing through the outer substrate 5, to the inner substrate 6, is reflected away from the driver. This light is either reflected back and away from the mirrored inner substrate, or is directed toward the inside of the case 1, which is blackened so as to absorb or otherwise diffuse incident light. Because of this, such light is not seen by the driver. As a result, the only image that the driver sees is the image (e.g., approaching headlights) developed responsive to the reduced (and controlled) reflectance of the outer substrate 5. This is to be compared with the image developed with prior mirror assemblies, such as the mirror assembly shown in FIG. 11B. It has been found that the use of plane glass as an outer substrate produces images that are potentially too dim to easily discern at night. The position of the inner substrate has the potential for producing regions of reflected light which can interfere with the driver's ability to discern the reflected images that are desired. These disadvantages, and the manner in which the rearview mirror assembly of the present invention operates to overcome them, will now be discussed in greater detail.

One special consideration is that at night, it is not only important for the mirror assembly to reduce the brightness of the headlights of approaching vehicles from all possible positions (primarily to the rear). It is also important that any redirected light (i.e., light reflected by the mirror assembly, or off of the side of the vehicle) should not hinder the ability of the driver to view the desired image (from the rearview mirror).

Figure 11B:
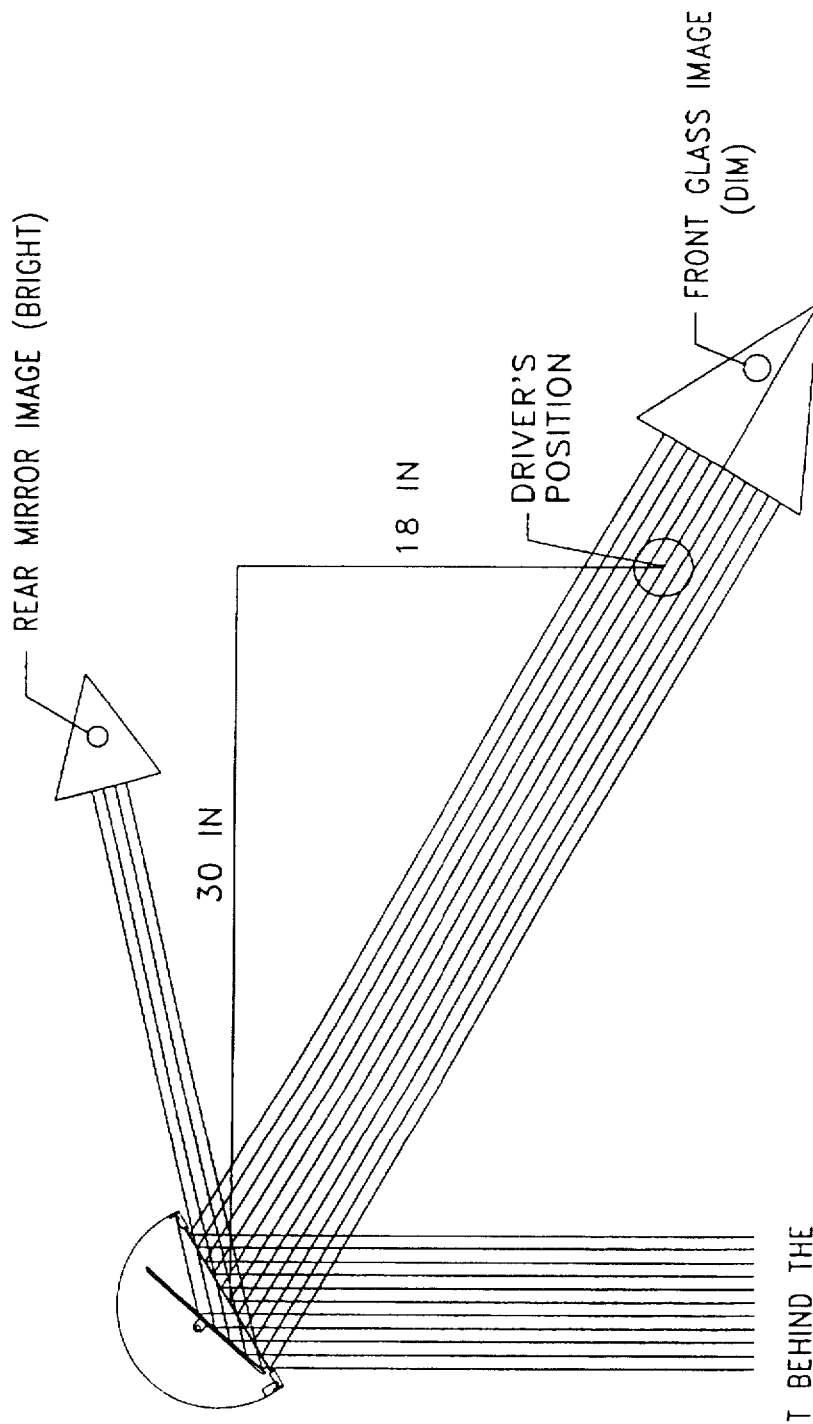
FIG. 11B is a similar schematic illustration of a prior dual state mirror assembly in a nighttime mode of operation.

Turning first to the reflection of unwanted light, reference is made to FIGS. 11A and 11B. FIG. 11A shows that for the rearview mirror assembly of the present invention, reflected light is diverted away from the vehicle. FIG. 11B shows that for this prior rearview mirror assembly, reflected light is directed toward the vehicle, in this case entering the cab of the vehicle. Because of this, the prior rearview mirror is made susceptible to the reflection of unwanted images at night (from the rear glass toward the driver), while the rearview mirror assembly of the present invention effectively eliminates this possibility.

Figure 12:
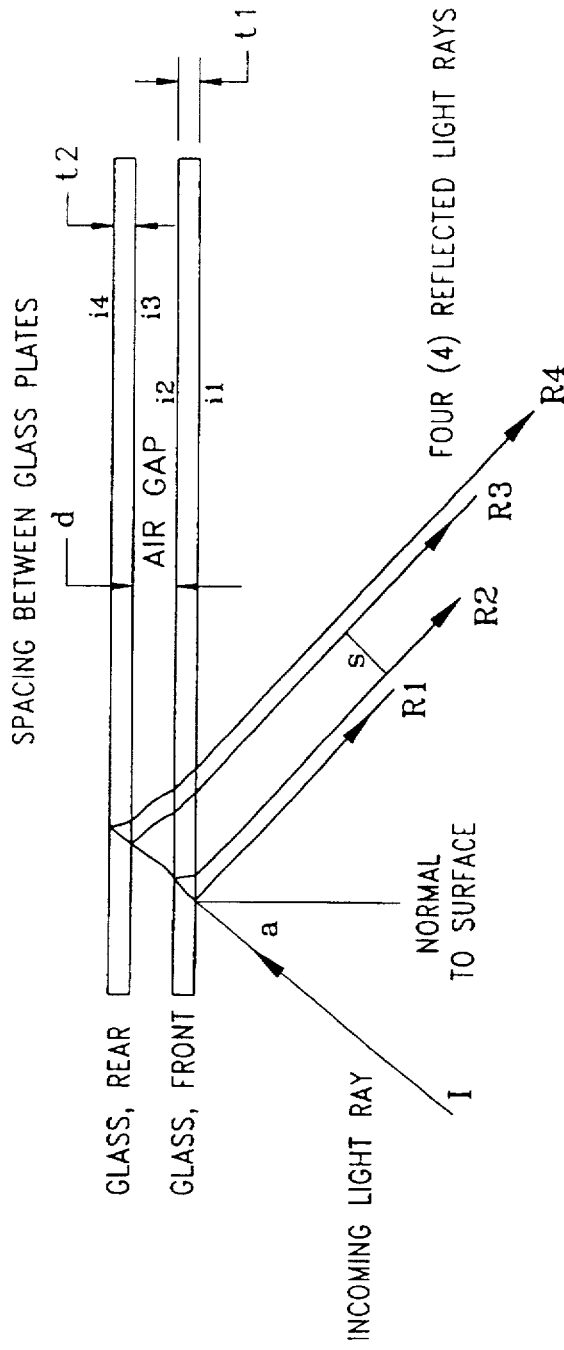
FIG. 12 is a schematic illustration showing optical characteristics for a spaced pair of substrates.

A dual state mirror must be capable of use in a high reflectance mode at night. In this situation, the substrates will be parallel to one another (both in accordance with the prior art and in accordance with the present invention). It therefore becomes necessary to analyze the formation of multiple images (from two parallel glass plates). To this end, reference is made to FIG. 12 and the following theoretical discussion appropriate to an understanding of this phenomenon. In general, the separation of reflected light rays to form multiple images is dependent upon the following parameters:

| | |
|---|---|
| a1 | angle of incidence of the incoming light; |
| t1 | thickness of the outer substrate; |
| t2 | thickness of the inner substrate; |
| n1 | index of refraction for air; |
| n2 | index of refraction for glass substrates; and |
| d | separation between the glass substrates. |

The separation of reflected rays of light is governed by Snell's Law, and is given by the following:

| | |
|---|---|
| s(2,1) = | separation between Ray1 and Ray2 |
| = | \|(2)(t1)tan(a2)\|cos(a1); where a2 is the angle of refraction at the surface i1, and the angle of incidence at the surface i2; |
| s(3,1) = | separation between Ray1 and Ray3 |
| = | \|(2)(t1)tan(a2) + (2)(d)tan(a3)\|cos(a1); where a3 is the angle of refraction at the surface i2, and the angle of incidence at the surface i3; |
| s(4,1) = | separation of Ray1 and Ray4 |
| = | [(2)(t1)tan(a2) + (2)(d)tan(a3) + (2)(t2)tan(a4)]cos(a1); where a4 is the angle of refraction at the surface i3 and the angle of incidence at the surface i4. |

Figure 10B:
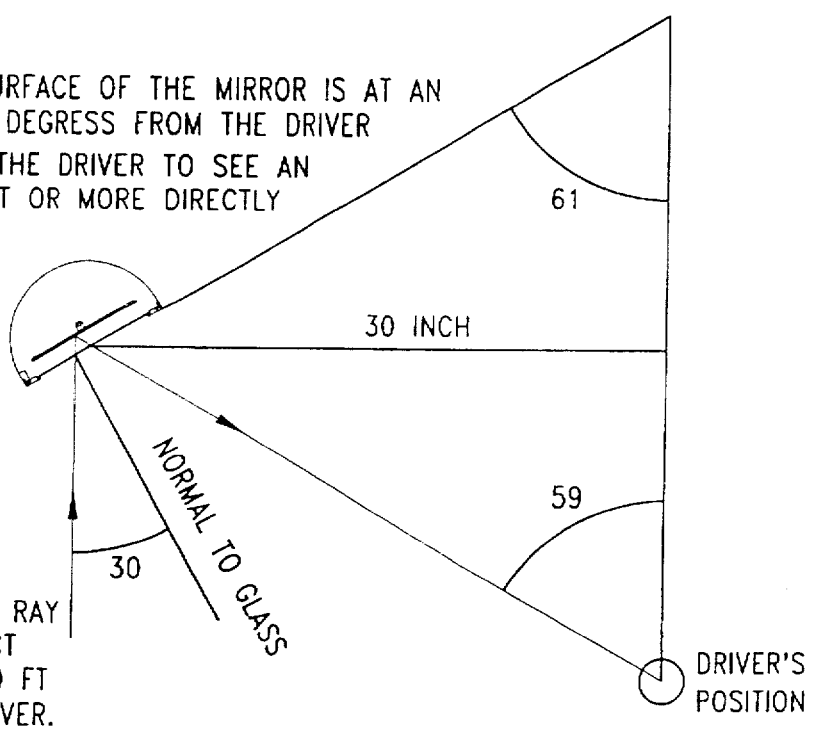
FIG. 10B is a similar schematic illustration of a prior dual state mirror assembly in a daytime mode of operation.
Figure 13A:
FIG. 13A, 13B and 13C are schematic illustrations of different images formed with a mirror, a spaced pair of substrates, and paired substrates implemented in accordance with the present invention, respectively.

For prior constructions such as are illustrated in FIGS. 10B and 11B, the front glass plate is fixed in position and the rear glass plate rotates on a centrally positioned vertical axis. Generally, the rear glass plate can rotate by 20.5 degrees, bringing one edge of the rear glass plate in near contact with the front glass plate. The width of the glass plate will generally be 6 inches. This suggests an estimated 1 inch separation between the two glass substrates, at their center (and uniformly when in parallel). Assuming a typical thickness of 0.125 inches for the two plate substrates, the dual headlights of a vehicle (FIG. 13A) will produce four separate images since there will be four interfaces for reflected and/or transmitted light. From the foregoing equations, the respective distances between the first image and the remaining three images will be:

s(2,1)=0.077 inches, s(3,1)=1.016 inches, and s(4,1)=1.094 inches;

therefore, s(4,3)=0.078 inches.

Figure 13B:

As a result, the driver observes four images, which will appear as two sets of blurred headlights (FIG. 13B).

For the mirror assembly of the present invention, the separation between the substrates 5, 6 can be kept to a distance of less than 0.01 inches. Further, since the inner substrate 6 includes only one operative face (its front surface mirror), only three images will be formed for a reflection of dual headlights, and the thickness of the inner substrate 6 will have no effect on optical performance (because all light is reflected from the front surface only).

Assuming thicknesses for the substrates 5, 6 of the rearview mirror assembly of FIGS. 10A and 10B (in accordance with the present invention) which correspond to those assumed for the glass plates of the prior rearview mirror assembly of FIGS. 10B and 11B (0.125 inches), the respective distances between the first image and the remaining two images will be:

s(2,1)=0.077 inches, and s(3,1)=0.087 inches;

therefore, s(3,2)=0.009 inches.

Figure 13C:

As a result, and for the mirror assembly of the present invention, the driver observes images which are nearly overlapping (FIG. 13C), providing a much clearer image for the driver to discern. The outer substrate 5 could be made thinner, to still further improve this optical performance, but the substrate would then tend to be more fragile.

Turning lastly to the brightness of the reflected image, and referring again to FIG. 12, such brightness is primarily dependent upon the transmissive and reflective properties at each air/glass interface i1, i2, i3 and i4, where i4 represents an interface at the rear of the inner substrate (where pertinent). Note that the interface i4 is not a concern for the inner substrate 6 of the present invention, which has a mirrored surface on its front face.

In general, a fraction of the incident light will be transmitted and a fraction will be reflected at each glass/air interface. For an uncoated glass surface, typically 96% of the incident light will be transmitted and 4% will be reflected. By coating the surface of the substrate (the outer substrate 5) with single or multiple layers of suitable thin metallic films, the respective transmissive and reflective values can be adjusted.

For the prior rearview mirror assembly of FIGS. 10B and 11B, no coating is provided on the front or rear surface of the outer glass plate, and no adjustment of the transmissive and reflective values for such a configuration is possible. For the inner glass plate, a mirror coating is described and, again, an adjustment of the transmissive and reflective values is not possible. However, the mirror assembly of the present invention uses an outer substrate (glass) which is well suited to the application of coatings for adjusting the transmissive and reflective values for the outer substrate 5.

Such coatings are preferably not applied to the front surface of the outer substrate 5, but rather are applied as a thin semi-transparent coating on the rear surface of the outer substrate 5. This allows the outer substrate 5 to provide a dimmed, reflected image, as is desired for typical nighttime operations. This also allows the outer substrate 5 to transmit light, in turn allowing light to pass to the mirrored front surface of the inner substrate 6, where it is appropriately reflected depending upon the mode of operation involved. For example, when the inner substrate 6 is in contact with the outer substrate 5, these surfaces combine to produce bright, overlapping images. When the inner substrate 6 is placed at an angle to the outer substrate 5, the two surfaces of the substrate 5 combine to produce dimmed, substantially overlapping images, while the outer surface of the substrate 6 directs remaining incident light away from the driver so that the driver can better discern the dimmed images which are produced.

It will be understood that various changes in the details, materials and arrangement of parts which have been herein described and illustrated in order to explain the nature of this invention may be made by those skilled in the art within the principle and scope of the invention as expressed in the claims which follow.

For example, as an alternative to the previously described rotation mechanism, separation of the substrates 5, 6 (from a closed position to an open position) can be accomplished with a DC motor, or other suitable drives, or may be accomplished with a translating mechanism instead of a rotating mechanism, if desired. In the latter case, the assembly supporting the inner substrate 6 would be caused to translate (straight) back from the outer substrate 5 until reaching a depth that satisfies the optical requirements for achieving a low reflectance state appropriate for nighttime operations. Although this option is not presently considered to be practical for class 6, 7 and 8 truck mirrors, since the depth and aerodynamics of the case would not be compatible with existing mirror installations, such a configuration could be useful for other classes of trucks, or other vehicles having different mirror sizes, shapes and mounting systems. Yet another alternative would be to use a mechanical mechanism for rotating (or translating) the inner substrate 6 relative to the outer substrate 5. This could include the use of cables (e.g., Belden cables), hand cranks (with suitable gearing) or the like extending from the cab of the vehicle to the rearview mirror assembly. However, in the interests of convenience in use and ease of assembly and installation, such mechanical devices are presently considered less preferred than the electrical devices previously described.

What is claimed is:

1. A dual state mirror assembly comprising:

a housing having an open front;

a first substrate mounted to the open front of the housing and forming an enclosure with the housing, wherein the first substrate has a surface coated with material for reflecting a portion of light incident on the surface and transmitting a remaining portion of light incident on the surface; and a second substrate including a reflective front surface and mounted within the enclosure, for movement between a first position in which the front surface of the second substrate is in direct contact with the first substrate, to produce a bright reflected image, and a second position in which the second substrate forms an angle with the first substrate, to produce a dimmed reflected image; and means for moving the second substrate between the first position and the second position.

2. The mirror assembly of claim 1 wherein the first substrate is a coated glass plate.

3. The mirror assembly of claim 2 wherein a surface of the glass plate includes a thin metal film coating.

4. The mirror assembly of claim 3 wherein the thin metal film coating includes a reflective metal selected from the group consisting of indium, tin, aluminum, chrome, nickel, oxides and combinations thereof.

5. The mirror assembly of claim 3 wherein the thin metal film coating has a reflectance value of from 10% to 30%.

6. The mirror assembly of claim 5 wherein the thin metal film coating has a transmissivity value of from 60% to 80%.

7. The mirror assembly of claim 6 having a reflectance value of about 15% and a transmissivity value of about 75%.

8. The mirror assembly of claim 3 wherein the thin metal film coating is applied to the glass plate in regions having different reflectance and transmissivity values.

9. The mirror assembly of claim 3 wherein the thin metal film coating is formed on an inside surface of the glass plate.

10. The mirror assembly of claim 9 which further includes a protective transparent coating applied to the thin metal film coating.

11. The mirror assembly of claim 9 which further includes an anti-reflective coating on an outside surface of the glass plate.

12. The mirror assembly of claim 3 having a plurality of thin metal film coatings.

13. The mirror assembly of claim 1 wherein the second substrate is a plate material selected from the group consisting of glass, plastic and metal, coated with a thin film.

14. The mirror assembly of claim 13 wherein the thin film coating has a reflectance value of from 60% to 95%.

15. The mirror assembly of claim 14 wherein the thin film coating has a reflectance value of about 90%.

16. The mirror assembly of claim 13 wherein the thin film coating is applied to the glass plate in regions having different reflectance and transmissivity values.

17. The mirror assembly of claim 1 wherein the housing has an aerodynamic shape.

18. The mirror assembly of claim 1 wherein the angle formed between the first substrate and the second substrate is from 20 degrees to 40 degrees.

19. The mirror assembly of claim 18 wherein the angle is about 35 degrees.

20. The mirror assembly of claim 1 which further comprises an electric heating element contained within the housing.

21. The mirror assembly of claim 20 wherein the electric heating element is associated with the second substrate.

22. The mirror assembly of claim 1 wherein the moving means operates responsive to a solenoid.

23. The mirror assembly of claim 22 wherein the solenoid is a push-type, cylindrical solenoid operable responsive to an applied DC voltage.

24. The mirror assembly of claim 1 wherein the moving means operates to rotate the second substrate relative to the first substrate, about a pivot point corresponding to contiguous lateral edges of the first substrate and the second substrate.

25. The mirror assembly of claim 1 wherein the moving means comprises:

a support assembly for receiving the second substrate and including an arm extending along the support assembly;

a locking assembly including a mounting bracket having an end which is pivotally connected to an end of the arm of the support assembly, and a sliding bracket attached to the mounting bracket to slide along the length of the mounting bracket;

an actuator including a pivot pin for engaging an aperture formed in the sliding bracket of the locking assembly, and an aperture formed in the arm of the support assembly; and a spring attached to and extending between the mounting bracket and the sliding bracket of the locking assembly.

26. The mirror assembly of claim 25 which further includes a locking bracket attached to and extending from the support assembly, and a roller bearing attached to the mounting bracket of the locking assembly, for engaging a lateral edge of the locking bracket.

27. The mirror assembly of claim 26 wherein the lateral edge of the locking bracket includes a bevelled portion for engaging the roller bearing to lock the moving means in an open position.

28. The mirror assembly of claim 25 which further includes a pivot connecting the support assembly and the arm, and springs extending between the support assembly and the arm on opposing sides of the pivot.

29. The mirror assembly of claim 25 which further includes means attached to the mounting bracket and engaging the actuator, for moving the actuator in a longitudinal direction along the mounting bracket.

30. The mirror assembly of claim 29 wherein the moving means is a solenoid.

31. The mirror assembly of claim 30 which further includes means for operating the solenoid in a first mode, for initiating operation of the moving means, and in a second mode, for locking the moving means in a position such that the second substrate remains in contact with the first substrate.

32. The mirror assembly of claim 31 wherein the first mode includes operating the solenoid at an increased voltage and at an about 10% duty cycle.

33. The mirror assembly of claim 32 wherein the second mode includes operating the solenoid at a decreased voltage and at an about 100% duty cycle.

34. A tandem mirror assembly for avoiding double images comprising:

a housing having an open front;

an at least partially transparent substrate mounted to the open front of the housing and forming an enclosure with the housing;

a reflective substrate mounted within the enclosure and positioned in direct contact with the at least partially transparent substrate; and means for rotating the reflective substrate about a lateral edge of the reflective substrate, and relative to the at least partially transparent substrate.

35. A dual state mirror assembly comprising:

a first substrate having a surface coated with material for reflecting a portion of light incident on the surface and transmitting a remaining portion of light incident on the surface; and a second substrate including a reflective front surface, for movement between a first position in which the front surface of the second substrate is in direct contact with the first substrate, to produce a bright reflected image, and a second position in which the second substrate forms an angle with the first substrate, to produce a dimmed reflected image.

36. An apparatus for controlling a dual state mirror including a first substrate having a surface for reflecting a portion of light incident on the surface and transmitting a remaining portion of light incident on the surface, and a second substrate including a reflective surface, for movement between a first position in which the front surface of the second substrate is adjacent to the first substrate, to produce a bright reflected image, and a second position in which the second substrate forms an angle with the first substrate, to produce a dimmed reflected image, the apparatus comprising:

a support assembly for receiving the second substrate and including an arm extending along the support assembly;

a locking assembly including a mounting bracket having an end which is pivotally connected to an end of the arm of the support assembly, and a sliding bracket attached to the mounting bracket to slide along the length of the mounting bracket;

an actuator including a pivot pin for engaging an aperture formed in the sliding bracket of the locking assembly, and an aperture formed in the arm of the support assembly; and a spring attached to and extending between the mounting bracket and the sliding bracket of the locking assembly.

37. The apparatus of claim 36 which further includes a locking bracket attached to and extending from the support assembly, and a roller bearing attached to the mounting bracket of the locking assembly, for engaging a lateral edge of the locking bracket.

38. The apparatus of claim 37 wherein the lateral edge of the locking bracket includes a bevelled portion for engaging the roller bearing to lock the moving means in an open position.

39. The apparatus of claim 36 which further includes a pivot connecting the support assembly and the arm, and springs extending between the support assembly and the arm on opposing sides of the pivot.

40. The apparatus of claim 36 which further includes means attached to the mounting bracket and engaging the actuator, for moving the actuator in a longitudinal direction along the mounting bracket.

41. The apparatus of claim 40 wherein the moving means is a solenoid.

42. The mirror assembly of claim 41 which further includes means for operating the solenoid in a first mode, for initiating operation of the moving means, and in a second mode, for locking the moving means in a position such that the second substrate remains in contact with the first substrate.

43. The mirror assembly of claim 42 wherein the first mode includes operating the solenoid at an increased voltage and at an about 10% duty cycle.

44. The mirror assembly of claim 43 wherein the second mode includes operating the solenoid at a decreased voltage and at an about 100% duty cycle.

45. The mirror assembly of claim 1, wherein the moving means automatically causes the second substrate to move to the first position upon electrical failure of the mirror assembly.

46. The mirror assembly of claim 45 wherein the moving means comprises one or more actuators for moving the second substrate between the first position and the second position and one or more springs for automatically moving the second substrate to the first position upon electrical failure of the one or more actuators.

47. The mirror assembly of claim 1, wherein the first substrate and second substrate are convex in shape.

48. The mirror assembly of claim 1, wherein the moving means comprises self-leveling means for ensuring that the second substrate is parallel to the first substrate in the first position.

49. The mirror assembly of claim 48, wherein the self-leveling means comprises two independent arms holding the second substrate and adapted to pivot the second substrate about a first leveling axis and further adapted to pivot the second substrate about a second leveling axis substantially perpendicular to the first leveling axis.

50. A dual state mirror assembly comprising:

a housing having an open front;

a first substrate mounted to the open front of the housing and forming an enclosure with the housing, wherein the first substrate has a surface for reflecting a portion of light incident on the surface and transmitting a remaining portion of light incident on the surface; and a second substrate including a reflective front surface and mounted within the enclosure, for movement between a first position in which the front surface of the second substrate is in direct contact with the first substrate, to produce a bright reflected image, and a second position in which the second substrate forms an angle with the first substrate, to produce a dimmed reflected image; and means for moving the second substrate between the first position and the second position.

51. The mirror assembly of claim 50, wherein the moving means automatically causes the second substrate to move to the first position upon electrical failure of the mirror assembly.

52. The mirror assembly of claim 51, wherein the moving means comprises one or more actuators for moving the second substrate between the first position and the second position and one or more springs for automatically moving the second substrate to the first position upon electrical failure of the one or more actuators.

53. The mirror assembly of claim 50, wherein the first substrate and second substrate are convex in shape.

54. The mirror assembly of claim 50, wherein the moving means comprises self-leveling means for ensuring that the second substrate is parallel to the first substrate in the first position.

55. The mirror assembly of claim 54, wherein the self-leveling means comprises two independent arms holding the second substrate and adapted to pivot the second substrate about a first leveling axis and further adapted to pivot the second substrate about a second leveling axis substantially perpendicular to the first leveling axis.

56. The mirror assembly of claim 50, wherein the second substrate has a thin film coating for reflecting light incident on the second substrate.

57. The mirror assembly of claim 56, wherein the thin film coating is applied in regions having different reflectance and transmissivity values.

* * * * *